United States Patent
Amin

(10) Patent No.: US 7,032,456 B1
(45) Date of Patent: Apr. 25, 2006

(54) ISOSTATIC PIEZORESISTIVE PRESSURE TRANSDUCER WITH TEMPERATURE OUTPUT

(75) Inventor: Ahmed H. Amin, North Attleboro, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/027,929

(22) Filed: Dec. 30, 2004

(51) Int. Cl.
*G01L 9/16* (2006.01)
(52) U.S. Cl. .................................................... 73/754
(58) Field of Classification Search .............. 73/754, 73/716, 721
See application file for complete search history.

(56) References Cited

U.S. PATENT DOCUMENTS

| | | | | |
|---|---|---|---|---|
| 3,688,223 A | * | 8/1972 | Pratt et al. .................. 333/194 |
| 4,576,052 A | * | 3/1986 | Sugiyama ................ 73/862.68 |
| 5,438,875 A | * | 8/1995 | Fung et al. .................... 73/721 |
| 5,962,950 A | * | 10/1999 | Egara et al. ............ 310/313 R |
| 6,023,978 A | * | 2/2000 | Dauenhauer et al. ......... 73/720 |
| 6,131,466 A | * | 10/2000 | Vigna et al. ................... 73/721 |
| 6,237,399 B1 | * | 5/2001 | Shivaram et al. .............. 73/105 |
| 6,272,928 B1 | * | 8/2001 | Kurtz ............................ 73/721 |
| 2003/0136196 A1 | * | 7/2003 | Wiklund et al. ............... 73/716 |
| 2003/0175062 A1 | * | 9/2003 | Kashiwaya et al. ......... 400/103 |
| 2004/0076531 A1 | * | 4/2004 | Takeuchi et al. ............ 417/322 |
| 2005/0160827 A1 | * | 7/2005 | Zdeblick et al. ............... 73/715 |
| 2005/0268726 A1 | * | 12/2005 | Kosht et al. ................... 73/777 |

* cited by examiner

*Primary Examiner*—Edward Lefkowitz
*Assistant Examiner*—George P Bonanto
(74) *Attorney, Agent, or Firm*—James M. Kasischke; Jean-Paul A. Nasser; Michael P. Stanley

(57) ABSTRACT

A pressure sensor includes a substrate having a top metallized pad formed on the top surface and a bottom metallized pad formed on the bottom surface. These pads are divided into segments for connection with piezoresistors. A sensing piezoresistor is formed on the substrate's top surface in order to respond to a pressure of interest. A reference piezoresistor is formed on the substrate's bottom surface to respond to a reference pressure. A conductive strip is joined between the two piezoresistors for conducting heat and electricity therebetween. A temperature measuring resistor can also be positioned on the substrate. The substrate and sensors can be positioned in a housing having electrical contacts in communication with the sensors for providing voltages in response to changing pressure differentials and temperatures.

13 Claims, 2 Drawing Sheets

ISOSTATIC PIEZORESISTIVE PRESSURE TRANSDUCER WITH TEMPERATURE OUTPUT

STATEMENT OF GOVERNMENT INTEREST

The invention described herein may be manufactured and used by and for the Government of the United States of America for Governmental purposes without the payment of any royalties thereon or thereto.

BACKGROUND OF THE INVENTION

1. Field of the Invention

The present invention relates to a pressure transducer, and more particularly a compact robust pressure transducer that can be included with a temperature output. The invention further relates to a compactly packaged pressure transducer that is well suited to measuring underwater pressures.

2. Description of the Prior Art

Real time acquisition of pressure and temperature data is essential for dynamic engine control and performance optimization of automotive, hydraulic, off-road vehicles, and marine systems. Underwater applications of the present invention include: passive depth finders (stand alone or complementary to sonar) for autonomous vehicles and their navigation, submarines, diving equipment, and off-shore drilling and exploration.

A brief discussion of material and device physics that leads to the present invention will be given. Piezoresistivity is the linear coupling between mechanical stress (pressure) and electrical resistivity. It has been observed in many solids. The specific change in resistivity $\rho_{ij}$ with stress $\sigma_{kl}$ is given by $$\Delta\rho_{ij}/\rho(0)=\Sigma_k\Sigma_l\pi_{ijkl}\sigma_{kl}, \ (i, j, k, l=1, 2, 3) \qquad (1)$$

where $\rho(0)$ is the zero-stress resistivity. The piezoresistivity tensor $\pi_{ijkl}$ in Eq. (1) has the dimension of reciprocal stress (m²/N). Using the condensed subscript notation, Equation 1 could be written in terms of the conjugate strain $\epsilon_k$ as follows $$\Delta\rho_i/\rho(0)=\Sigma_j\pi_{ij}\sigma_j=\Sigma_j\Sigma_k\pi_{ij}c_{jk}\epsilon_k=\Sigma_k m_{ik}\epsilon_k, \ (i, j, \ldots =1, 2, 3, \ldots 6) \qquad (2)$$

where, $m_{ik}=\Sigma_j \pi_{ij} c_{jk}$. The dimensionless $m_{ik}$ is the elastoresistance tensor known as the gauge factor. The three independent $\pi_{ij}$ coefficients for silicon (cubic symmetry group m3m) are $\pi_{11}$, $\pi_{12}$, and $\pi_{44}$. The hydrostatic coefficient is given by $\pi_h=-(\pi_{11}+2\pi_{12})$. For isotropic (spherical symmetry group ∞/∞ mm) solids, there are only two independent components $\pi_{11}$ and $\pi_{12}$ with $\pi_{44}=2(\pi_{11}-\pi_{12})$ and $\pi_h=-(\pi_{11}+2\pi_{12})$. The longitudinal, transverse, and shear modes in silicon have been used in many commercial pressure, vibration, acceleration, strain, and tactile sensors. Elastic effects, i.e., resistance change due to changes in dimension of the piezoresistor with mechanical stress must be factored out, in order to obtain the true piezoresistive effect. In other words, the experimentally derived piezoresistance coefficients $\Pi_{ij}=(1/R_o)(\partial R_i/\partial \sigma_j)$, where $R_o$ and $R_i$ are the unstressed and stressed resistances respectively, must be corrected for elasticity to obtain the true piezoresistivity $\pi_{ij}$ coefficients. The corrections for the longitudinal $\Pi_{11}$, transverse $\Pi_{12}$, and hydrostatic $\Pi_h$ components are given by, $$\pi_{11}=\Pi_{11}-(s_{11}-2s_{12}) \qquad (4)$$

$$\pi_{12}=\Pi_{12}+s_{11}. \qquad (5)$$

$$\pi_h=\Pi_h-(s_{11}+2s_{12}) \qquad (6)$$

where $\Pi_h=(1/R_o)(\partial R_1/\partial \sigma_h)$ is the experimentally derived hydrostatic piezoresistance coefficient and $s_{ij}$ are the elastic compliances that appear in the linear theory of elasticity. For screen printed metal-insulator-metal (MIM) structures, the elastic compliances $s_{ij}$ are those of the substrate.

Numerical values for silicon and commercial Electro-Science Laboratories (ESL) ruthenium based MIM piezoresistors are listed in Table I. Note the large hydrostatic piezoresistivity coefficient $\pi_h$ of MIM structures relative to those of silicon, in addition to a much lower temperature coefficient of $\pi_h \sim 430$ ppm/° C. for MIM piezoresistors as opposed to 2000 ppm/° C. for silicon. The two engineering parameters for a transducer design, namely, the magnitude and temperature dependence of $\pi_h$ (span) and the direct current resistance at zero stress (offset) for a ruthenium-based MIM structure are known in the art.

| Material | Resistivity (Ω-cm) | $\pi_{11}$ | $\pi_{12}$ | $\pi_{44}$ | $\pi_1$ | $\pi_h$ |
|---|---|---|---|---|---|---|
| n-Si | 11.7 | −1022 | 530 | 116 | −1022 | 38 |
| p-Si | 7.8 | 66 | −11 | 1383 | 935 | −44 |
| ESL D3414 | 4 (kΩ) | 45[a] | 30[a] | | | −310[a] |
| ESL 3414A | 8 (kΩ) | | | | | −4.90[a] |

[a]Room temperature values), the temperature coefficient of $\pi_{ij}$ is ~2000 ppm/° C. for Si and ~430 ppm/° C. for ESL MIM piezoresistors.

Table I. Piezoresistivity Coefficients $\pi_{ij}$ ($10^{-12}$ m²/N)

As seen from Table I, the hydrostatic coefficient for silicon, is rather small compared to the longitudinal, transverse and shear components. However, the converse is true for ruthenium based MIM structures. The hydrostatic coefficient $\pi_h$ is approximately ten times that of the other two coefficients. Besides, it is much higher than what would be expected from the relationship $\pi_h=-(\pi_{11}+2\pi_{12})$ assuming a spherical symmetry. Theoretical interpretation of this phenomenon is given in A. Amin, Piezoresistivity of Ruthenium-Based-Metal-Insulator-Metal Structures, J. Mat. Res. 16 (8), 2239–2243 (2001) which is incorporated herein by reference.

The longitudinal piezoresistivity coefficient $\pi_1$ and maximum sensitivity directions for silicon can be determined from the symmetry allowed $\pi_{11}$, $\pi_{12}$, and $\pi_{44}$ coefficients. For a thin long bar cut parallel to an arbitrary direction in the crystal, $\pi_1$ is given by, $$\pi_1=\pi_{11}+2(\pi_{44}+\pi_{12}-\pi_{11})F(\theta,\phi), \qquad (7)$$

where $F(\theta,\phi)=\sin^2\theta \cos^2\theta+\cos^4\theta \cos^2\phi \sin^2\phi$. According to Eq. (7), sensitivity extrema are along the 4-fold symmetry directions for n-type silicon and the 3-fold symmetry directions for p-type. This representation illustrates the need for precise alignment of the maximum sensitivity directions of silicon piezoresistors along the stress maxima on the diaphragm. This requirement becomes inconsequential under hydrostatic pressure, the representation surface degenerates to a sphere with radius vector equal to $\pi_h$. The magnitude of $\pi_h$ is rather small for silicon, in comparison to the recently discovered ruthenium-based MIM structures. (See Table I).

The most common geometry of piezoresistive pressure sensors is the edge clamped diaphragm. Four resistors are usually deposited on the diaphragm and connected to form a Wheatstone bridge. The resistors are oriented in a manner to take advantage of the maximum sensitivity directions of the piezoresistive element as described by Eq. (7) and the elastic boundaries in the diaphragm to double the bridge response to pressure signals. To design an accurate and sensitive sensor, it is necessary to analyze the diaphragm stress-strain response using plate theory and finite element techniques. Elastic anisotropy, nonlinearity, and maximum piezoresistivity directions must all be considered in the analysis. The deposition technique and complexity are application specific. They depend on the piezoresistor and diaphragm materials. Standard integrated circuit (IC) technology and micromachining are used for fabricating silicon pressure sensors. For hybrid devices, sputtering is used for thin metallic films and screen-printing for thick films, respectively. The diaphragm material ranges from Si and Ge to alumina, sapphire, and dielectric coated stainless steel.

The problems associated with micro-machined piezoresistive silicon and other diaphragm-type architecture are thermal drift errors, response nonlinearity, and hysteresis. Besides, media compatibility has been problematic for the silicon diaphragm pressure sensor. A temperature change can cause the sensor's offset and span (sensitivity) to vary independently, giving rise to an undesired output. Minor process variations, e.g., resistor misalignment, variations in the diaphragm thickness and anisotropy of the elastic properties, will contribute to response nonlinearity and hysteresis. Two orthogonal calibrations are required to eliminate thermal errors in offset and span. Application specific temperature compensation techniques using laser trimming and external resistors have been employed for limited pressure and temperature ranges. Simulation techniques to analyze the effect of error sources on the sensor output and to provide digital compensation algorithms using integrated circuit technology are available.

SUMMARY OF THE INVENTION

The present invention is directed to a pressure sensor includes a substrate having a top metallized pad formed on the top surface and a bottom metallized pad formed on the bottom surface. These pads are divided into segments for connection with piezoresistors. A sensing piezoresistor is formed on the substrate's top surface in order to respond to a pressure of interest. A reference piezoresistor is formed on the substrate's bottom surface to respond to a reference pressure. A conductive strip is joined between the two piezoresistors for conducting heat and electricity therebetween. A temperature measuring resistor can also be positioned on the substrate. The substrate and sensors can be positioned in a housing having electrical contacts in communication with the sensors for providing voltages in response to changing pressure differentials and temperatures.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DESCRIPTION OF THE PREFERRED EMBODIMENTS

Recent studies on the effect of hydrostatic pressure on the resistance change of commercial MIM thick film resistors over a wide temperature range (−25° C. to +135° C.) have demonstrated: excellent linearity, no hysteresis, large hydrostatic piezoresistivity coefficient $\pi_h$, and small and linear temperature dependence sensitivity (i.e., the piezoresistivity coefficient $\pi_h$) over the temperature range −25° C. to +135° C. compared to silicon. The present invention incorporates the above transduction features into a transducer design capable of measuring pressure (absolute, gauge, or differential) along with temperature output capabilities. Additionally, under isostatic pressure, precise alignment of the piezoresistive elements for maximum sensitivity becomes inconsequential and high pressures can be applied without destroying the sensing element or its symmetry. Therefore, the operable piezoresistive coefficients remain invariant, leading to a stable transducer operation. The transducer architecture and package design are described below.

Figure 1:
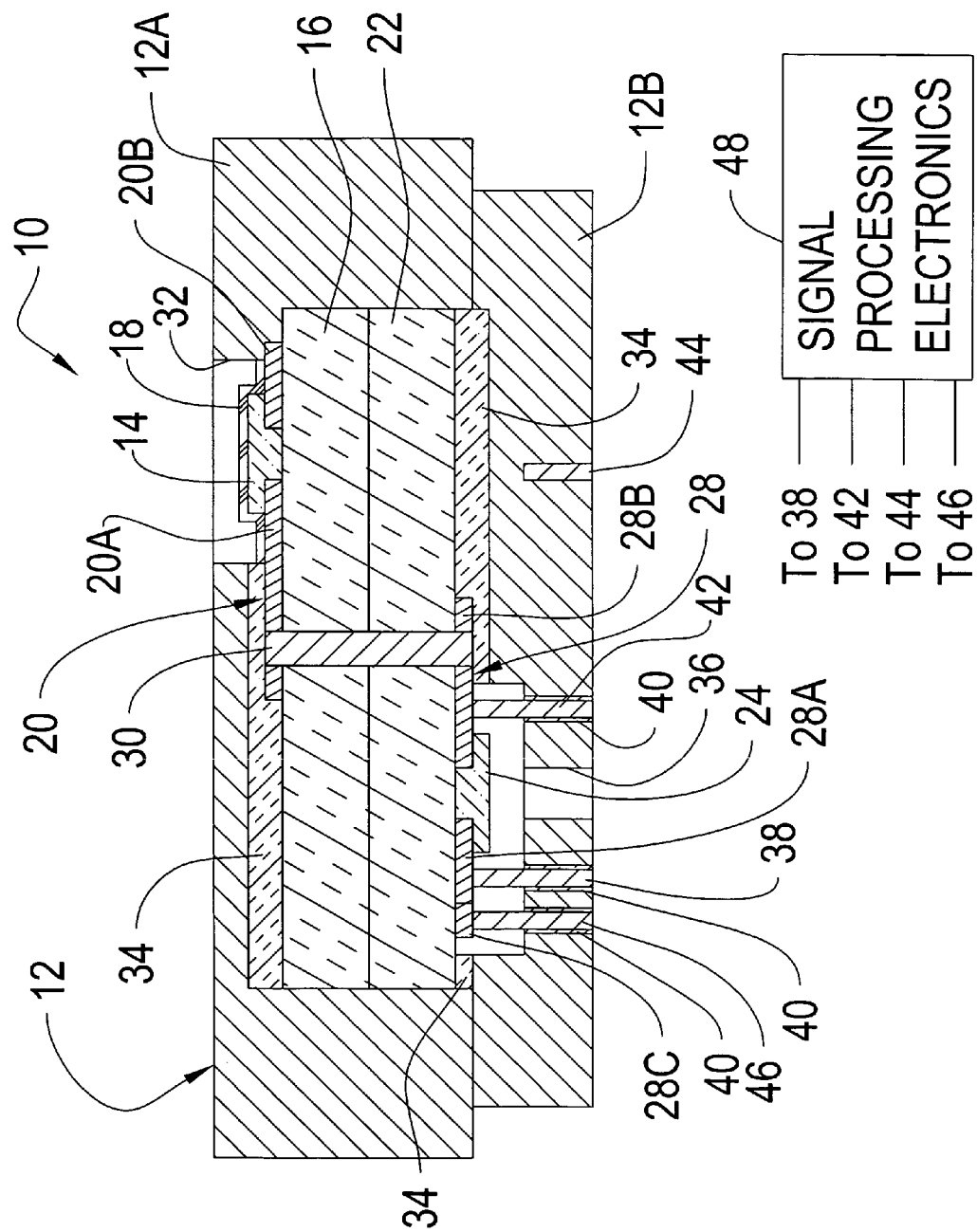
FIG. 1 is a cross-sectional view of the pressure transducer and housing of the current invention.
Figure 2A:
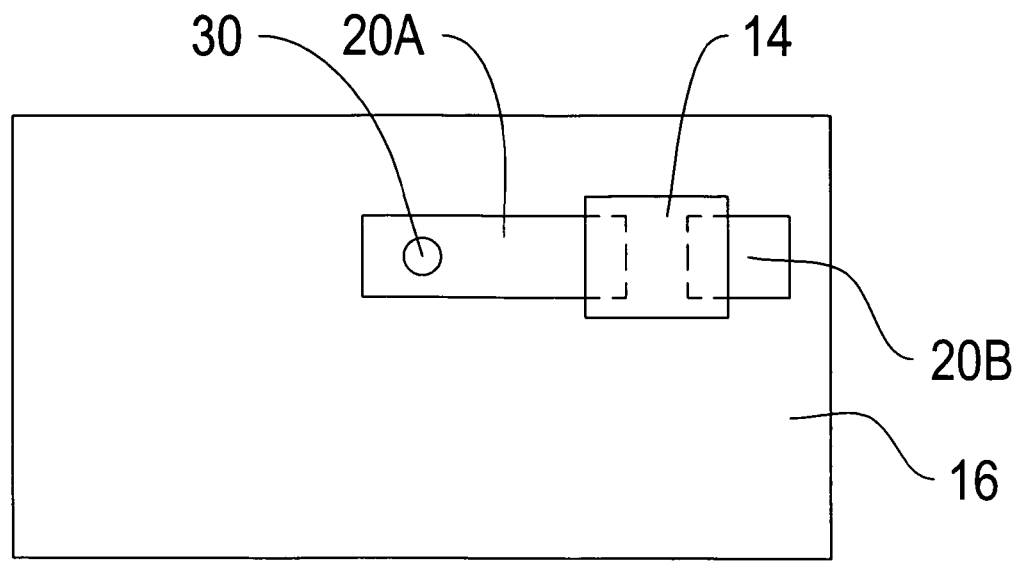
FIG. 2A is a top view of the first substrate of the invention having the pressure sensing transducer formed thereon.

In FIG. 1, there is shown an isostatic pressure transducer 10 of the current invention as positioned in a housing 12. The transducer 10 includes a sensing piezoresistor 14 formed on a first substrate 16. Sensing piezoresistor 14 is a Metal-Insulator-Metal (MIM) thick film resistor. In one embodiment, sensing piezoresistor 14 can be a 1 mm square fabricated from ESL D3414 or the like. Either the A or B series of this material can be used. Screen printing is the preferred deposition method. An overcoat 18 is printed over the sensing piezoresistor 14 to protect against environmental exposure. Substrate 16 is preferably an alumina substrate. Sensing piezoresistor 14 is formed on the first substrate 16 in contact with a top metallized pad 20. The top metallized pad is separated into two segments. The first segment is identified as 20A, and the second is identified as 20B. The metallized pads are preferably made from silver-palladium (ESL 9635-A or the like) or gold (ESL 8836 or the like). FIG. 2A provides a top view of the transducer 10, sensing piezoresistor 14, and top metallized pad 20 formed on first substrate 16.

Figure 2B:
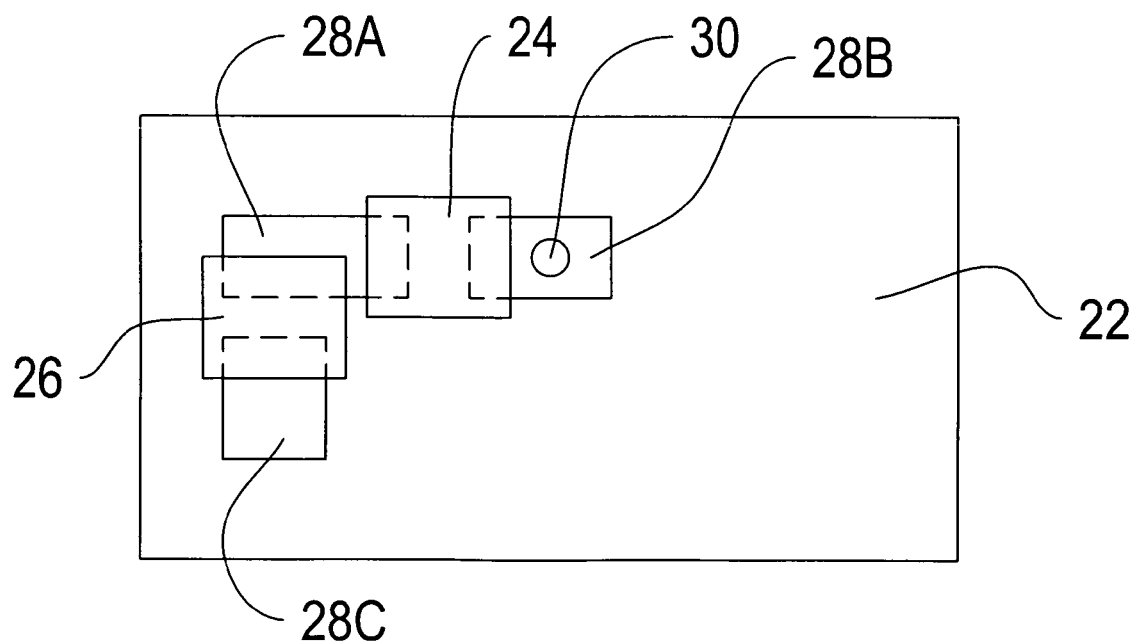
FIG. 2B is a top view of the second substrate of the invention having the pressure reference transducer and a temperature sensor formed thereon.

A second substrate 22 is also positioned in housing 12. First substrate 16 and second substrate 22 could be a single substrate; however, they are separated to allow the use of conventional manufacturing techniques. Second substrate 22 has a reference piezoresistor 24 formed thereon. Reference piezoresistor 24 is preferably of the same construction and size as the sensing piezoresistor 14 in order to provide matched performance. As shown in FIG. 2B, a thick film temperature sensitive resistor 26 is also deposited on second substrate 22. Temperature sensitive resistor 26 is preferably made from ESL PTC-2650 or the like. Reference piezoresistor 24 and temperature sensitive resistor 26 are formed in contact with a bottom metallized pad 28. Bottom metallized pad 28 has three segments identified as 28A, 28B and 28C. Reference piezoresistor 24 is positioned in contact with first segment 28A and second segment 28B. Temperature sensitive resistor 26 is positioned in contact with the first segment 28A and the third segment 28C. FIG. 2B provides a top view of reference piezoresistor 24, temperature sensitive resistor 26 and bottom metallized pad 28 positioned on second substrate 22. A conductive strip 30 thermally and electrically couples sensing piezoresistor 14 to reference piezoresistor 24. Conductive strip 30 is preferably made from copper. Conductive strip 30 is positioned in contact with the first segment 20A of top metallized pad 20. Conductive strip 30 extends through substrates 16 and 24 where it is positioned in contact with the second segment 28B of bottom metallized pad 28.

In other embodiments, temperature sensitive resistor 26 can be omitted or positioned on the top surface of substrate 16. Omission of resistor is possible because of the low sensitivity of pressure piezoresistors 14 and 26 in the operating temperature range as previously discussed. While positioning on the top surface of substrate 16 is possible, it complicates the electrical connections with the temperature sensitive resistor 26.

Housing 12 is preferably fabricated in a top half 12A and a bottom half 12B from a corrosion resistant conductive material such as stainless steel. Top half 12A is formed with a cavity accommodating first substrate 16 and second substrate 22. Top half 12A has a pressure port 32 formed therein in communication with sensing piezoresistor 14. Housing 12 seals against substrates 16 and 22 to prevent leakage of environmental fluid around substrates. An insulating material 34 such as Kapton™ or polyurethane is positioned between housing top half 12A and first segment 20A of metallized pad 20. Conductive strip 30 is also insulated from housing 12. Housing top half 12A is in electrical contact with second segment 20B.

Housing top half 12A is joined to housing bottom half 12B in such a manner as to provide an electrically conductive pathway between top half 12A and bottom half 12B. In one embodiment bolts are utilized to join these halves. Mechanical devices such as alignment pins can be utilized to ensure that pressure port 32 aligns with sensing piezoresistor 14.

Housing bottom half 12B is positioned under second substrate 22 and sealing the cavity formed by top half 12A. A reference pressure port 36 in communication with reference piezoresistor 24 is formed in bottom half 12B. Reference pressure port 36 can be subjected to a vacuum or an environmental reference pressure to give an absolute or gauge pressure reading. Bottom half 12B is electrically insulated from contact with bottom metallized pad 28 and conductive strip 30 by insulating material 34. A plurality of contact pins 38, 42, 44 and 46 are positioned in bottom half 12B. Contact pins are preferably spring pins. A first contact pin 38 extends through housing 12 bottom half 12B and makes contact with bottom metallized pad 28 first segment 28A. First contact pin 38 is insulated from housing 12 by insulating material 40. Second contact pin 42 extends through housing bottom half 12B and is in electrical contact with second segment 28B. Pin 42 is also insulated from housing 12 by insulating material 40. Third contact pin 44 is joined electrically to housing 12. Fourth contact pin 46 passes through housing 12 and is electrically insulated from housing 12 by insulating material 40. Inside housing 12 pin 46 makes electrical contact with third segment 28C.

Pins 38, 42, 44 and 46 are joined to signal processing electronics 48 to analyze the resistance across sensor piezoresistor 14, reference piezoresistor 24 and temperature sensing resistor 26. The voltage, $V_1(P_1,T)$, between first contact pin 38 and second contact pin 42 is proportional to reference pressure $P_1$ and temperature T. The voltage $V_2(P_2,T)$ between second contact pin 42 and third contact pin 44 is proportional to the pressure of interest $P_2$ and temperature T. The voltage $V_3(T)$ between first contact pin 38 and fourth contact pin 46 is proportional to the temperature T.

It will be understood that many additional changes in the details, materials, steps and arrangement of parts, which have been herein described and illustrated in order to explain the nature of the invention, may be made by those skilled in the art within the principle and scope of the invention as expressed in the appended claims. For example, the sensors do not have to be arranged as shown in FIGS. 2A and 2B, and the contacts do not need to be positioned as shown in FIG. 1.

What is claimed is:

1. A pressure sensor comprising:
    a substrate having a top surface and a bottom surface;
    a top metallized pad formed on said substrate top surface and having a first top pad segment and a second top pad segment;
    a bottom metallized pad formed on said substrate bottom surface and having a first bottom pad segment and a second bottom pad segment;
    a sensing piezoresistor formed on said substrate top surface in electrical communication between the first top pad segment and the second top pad segment of said top metallized pad, said sensing piezoresistor being positioned to respond to a pressure of interest;
    a reference piezoresistor formed on said substrate bottom surface in electrical communication between the first bottom pad segment and the second bottom pad segment of said bottom metallized pad said sensing piezoresistor being positioned to respond to a reference pressure; and
    a conductor joined to the first top pad segment and the second bottom pad segment for conducting electricity; and
    a first electrical contact joined to the first bottom pad segment;
    a second electrical contact joined to the second bottom pad segment; and
    a third electrical contact joined to the second top pad segment whereby a differential pressure can be calculated from the resistances between said first, second and third electrical contacts.

2. The device of claim 1 wherein:
    said conductor is capable of conducting heat between said top metallized pad and said bottom metallized pad;
    said bottom metallized pad has a third bottom pad segment formed thereon; and
    further comprising:
    a temperature measuring resistor formed on said substrate bottom surface in electrical communication between the third bottom pad segment and the first bottom pad segment of said bottom metallized pad, said temperature measuring resistor being positioned to respond to a temperature of the conductor;
    a fourth electrical contact joined to the third bottom pad segment whereby a temperature can be calculated from the resistance between the third bottom pad segment and the first bottom pad segment.

3. The device of claim 2 wherein said sensing piezoresistor and said reference piezoresistor are ruthenium based metal-insulator-metal thick film structures.

4. The device of claim 2 wherein said sensing piezoresistor and said reference piezoresistor are matched to provide the same resistance at a desired temperature and pressure.

5. The device of claim 4 further comprising a housing positioned about said substrate such that said sensing piezoresistor can be exposed to the pressure of interest and said reference piezoresistor can be exposed to the reference pressure.

6. The device of claim 5 further comprising a signal processing apparatus joined to said first, second, third and fourth electrical contacts for receiving the voltage differences between the first and second electrical contacts, the second and third electrical contacts, and the first and fourth electrical contacts, said signal processing apparatus being capable of calculating the temperature and differential pressure from these voltages.

7. The device of claim 5 wherein said housing is electrically conductive and joined electrically to said second top pad segment, said third contact being joined to said housing, said housing being electrically insulated from said substrate, said first bottom pad segment, said second bottom pad segment, said third bottom pad segment, said first top pad segment and said conductor.

8. The device of claim 1 further comprising a housing positioned about said substrate such that said sensing piezoresistor can be exposed to the pressure of interest and said reference piezoresistor can be exposed to the reference pressure.

9. The device of claim 1 further comprising a signal processing apparatus joined to said first, second, and third electrical contacts for receiving the voltage differences between the first and second electrical contacts, and the second and third electrical contacts, said signal processing apparatus being capable of calculating the differential pressure from these voltages.

10. The device of claim 1 wherein said substrate comprises:

an upper substrate layer having a top surface and a bottom surface; and a lower substrate layer having a top surface and a bottom surface, said upper substrate layer being positioned against said lower substrate layer such that the bottom surface of said upper substrate layer contacts the top surface of said lower substrate layer.

11. The device of claim 10 wherein said conductor extends from the top surface of the upper substrate layer to the bottom surface of the lower substrate layer.

12. The device of claim 11 further comprising a housing positioned about said substrate such that said sensing piezoresistor can be exposed to the pressure of interest and said reference piezoresistor can be exposed to the reference pressure.

13. The device of claim 12 wherein said housing is electrically conductive and joined electrically to said second top pad segment, said third contact being joined to said housing, said housing being electrically insulated from said substrate, said first bottom pad segment, said second bottom pad segment, said first top pad segment and said conductor.

* * * * *